United States Patent
Halladay et al.

(10) Patent No.: US 6,838,407 B2
(45) Date of Patent: Jan. 4, 2005

(54) ROOM TEMPERATURE CURABLE FLUOROPOLYMER COATING

(75) Inventors: James R. Halladay, Harborcreek, PA (US); Frank J. Krakowski, Erie, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/997,443

(22) Filed: Nov. 30, 2001

(65) Prior Publication Data

US 2003/0104213 A1 Jun. 5, 2003

(51) Int. Cl.$^7$ ................................................. C08F 14/22
(52) U.S. Cl. ....................... 502/100; 502/102; 502/104; 502/326.2; 502/342; 502/343
(58) Field of Search ................. 502/100, 102, 502/104, 326.2, 342, 343; 525/100, 102, 104, 326.2, 342, 343

(56) References Cited

U.S. PATENT DOCUMENTS

| | | |
|---|---|---|
| 4,395,462 A | 7/1983 | Polmanteer |
| 4,960,942 A | 10/1990 | Gerkin et al. |
| 4,973,761 A | 11/1990 | Schoenleben et al. |
| 5,003,107 A | 3/1991 | Zimmerman et al. |
| 5,206,320 A | 4/1993 | Dougherty et al. |
| 5,352,835 A | 10/1994 | Dai et al. |
| 5,422,042 A | 6/1995 | Waddill et al. |
| 5,439,896 A | 8/1995 | Ito et al. |
| 5,457,147 A | 10/1995 | McGrath et al. |
| 5,621,042 A * | 4/1997 | Hanada et al. ............... 525/102 |
| 5,621,942 A | 4/1997 | Eustache et al. |
| 5,744,200 A | 4/1998 | Badesha et al. |
| 6,114,446 A | 9/2000 | Narisawa et al. |

* cited by examiner

Primary Examiner—Robert D. Harlan
(74) Attorney, Agent, or Firm—Miles B. Dearth

(57) ABSTRACT

The coating composition of the invention cures at room temperature, and forms a coating which is resistant to flex-fatigue. environmental temperature variability and provides for excellent adhesion to flexible elastomeric substrates. The coating in two parts comprises (A) a graft-modified fluoroelastomer and (B) a curing component containing at least one group reactive with an active hydrogen bearing group, such as an isocyanate group and another group which forms crosslinks, and (C) a solvent. The coating is prepared by mixing and milling the fluoroelasomer which has been graft-functionalized with an active hydrogen bearing group groups. The first part is admixed with the second part prior to applying the coating. Gelation of the coating takes place at room temperature over several hours with complete cure taking place within about 24 hours.

14 Claims, 2 Drawing Sheets

ROOM TEMPERATURE CURABLE FLUOROPOLYMER COATING

FIELD OF THE INVENTION

The invention is directed to elastomeric coating materials containing a fluoroelastomer which is useful for protective coatings on other elastomeric materials subject to demanding environments.

BACKGROUND OF THE INVENTION

Elastomeric materials are utilized in numerous industrial application articles, for example in myriad molded shapes, belts, hoses. Molded elastomers can be bonded to reinforcing members such as metallic materials with such common devices including dampers and mounts which provide vibration control, e.g., engine mounts. In many applications, the elastomer article is often exposed to oils, fuels, or other degrading substances. Many conventional vulcanized elastomeric materials typically tend to degrade when exposed to petroleum-based products. Most vulcanized elastomers which exhibit resistance to petroleum based products also exhibit poor fatigue resistance. There has been a continuing search within the elastomer industry to develop an elastomer which is both resistant to degrading chemicals and resistant to fatigue.

One method of rendering elastomeric materials resistant to degrading chemicals is to apply a protective coating. However, when these oil-resistant coatings have been applied to flexible elastomeric substrates such as natural rubber or polybutadiene, the elastomers suffer from poor fatigue resistance and poor adhesion to the natural rubber or polybutadiene substrate, manifested as cracking, separation from the elastomer and a breach of the coating.

U.S. Pat. No. 5,621,042 discloses an isocyanate modified fluoroolefin-vinyl ether copolymer resin. The fluoroolefin-vinyl ether copolymer resins do not exhibit elastic rebound at 100% elongation without deformation and would not be suitable for coating flexible elastomeric substrates like rubber according to the present invention.

U.S. Pat. No. 4,395,462 discloses a coating for silicone elastomers derived from a peroxide-curable fluoroelastomer gum composition which contains (1) an epoxide compound in an amount sufficient to react with the acidic by-products generated during curing of the elastomer, and (2) an organic peroxide in an amount sufficient to achieve curing of the fluoroelastomer gum at elevated temperatures.

There is an unmet need for a fluoroelastomer coating that can be applied to non-oil-resistant elastomers such as the various non-fluorinated elastomers NR, PBD, SPR, EPDM, BUTYL, CHLOROPRENE, types, etc. The need exists to provide a protective coating that has improved durability, flex-fatigue resistance as well as fuel and solvent resistance which can be applied and cured without the need for subjecting the vulcanized article to additional heat-curing.

SUMMARY OF THE INVENTION

The present invention is embodied in a room temperature curable fluoroelastomer coating composition which applied to flexible elastomeric substrates that provides excellent resistance to flex-cracking, and resistance to swelling in hydrocarbon oils and fuels. More generally, the invention is directed to modified fluorocarbon elastomer coating wherein a flouorelastomer is a modified fluoroelastomer. The fluoroelastomer is functionalized by reacton with a grafting agent that contains a graft-linking group and an active hydrogen-bearing group. The graft-modified backbone of the fluoroelastomer contains a pendant active hydrogen-bearing group and is subsequently cured by combining with a curing component in the coating. The curing component introduced into the coating solution prior to applying the coating contains at least two groups which form a crosslink between two active hydrogen-bearing groups on the fluoroelastomer. Specifically, in preferred embodiments, the graft-linking group is a primary amine and the active hydrogen-bearing group is a hydroxyl or carboxyl group, and the curing component contains an isocyanate group and a group which forms crosslinks. More specifically the curing component contains an isocyanate or isocyanate-bearing groups.

Bound hydroxyl groups on the graft-functionalized fluoroelastomer can be provided by reaction with a preferred grafting agent that contains a primary amine and one or more active hydrogen-bearing groups. The preferred grafting agent is a compound that contains a primary unhindered amine, and one or more than one isocyanate or isocyanate-reactive group(s).

The graft-functionalized fluoroelastomer is combined with a curing agent such as a polyfunctional aziridine, a carbodiimide, a polyisocyanate or an alkoxysilane containing an isocyanate moiety by dissolving in a solvent, applying as a coating to a variety of elastomers and crosslinking the coating to form a chemically resistant bond.

In an alternative embodiment, the fluoroelsastomer is graft-functionalized by reaction with mercaptoalcohol, mercaptosilane and -silanol, mercaptothiols, or hydroxyl-functional ethylenic unsaturated compounds.

DETAILED DESCRIPTION OF THE PREFERRED EMBODIMENTS

Fluoroelastomer

Figure 1:
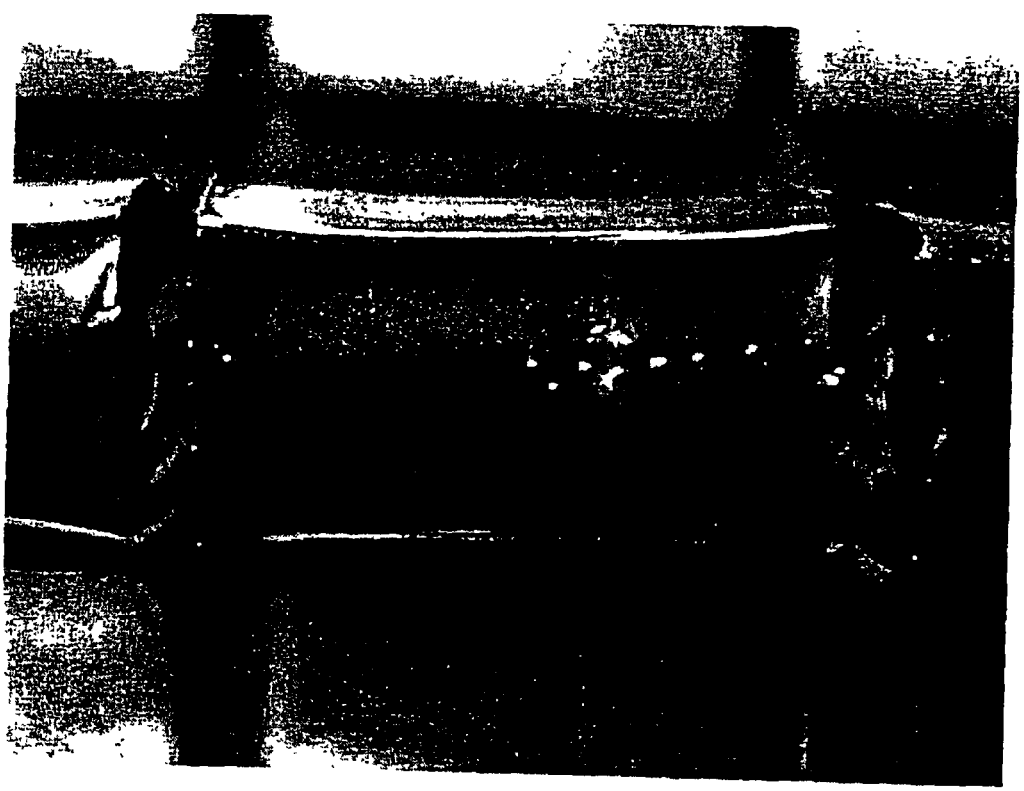
FIG. 1 is a photograph of a DeMattia flex specimen coated with a conventional coating after 3720 flex cycles.

Fluorocarbon elastomers (fluoroelastomers) are derived from hydrocarbons, including vinylidene fluoride, hexafluoropropylene and are commercially available from a number of suppliers. A detailed discussion of the various types of fluoroelastomers is contained in an article by R. G. Arnold, A. L. Barney and D. C. Thompson that appeared in the July, 1973 issue of a journal entitled "Rubber Chemistry and Technology" (Volume 46, pp. 619–652). A fluoroelastomer is distinguished from a thermoplastic fluoropolymer principally by whether plastic deformation occurs upon stressing the fluoroelastomer to 100% elongation. Fluoroplastics undergo deformation on stretching and are unsuitable coating materials for elastomeric substrates according to the present invention.

The representative fluoroelastomers used herein include polymers derived from one or more fluorinated monomers. Example polymers derived from a fluorinated monomer or combinations of two or more fluorinated monomers include 1,1-dihydroperfluorobutyl acrylate; copolymers of vinylidene fluoride and chlorotrifluoroethylene; vinylidene fluoride and hexafluoropropylene; vinylidene fluoride and hydropentafluoropropylene; tetrafluoroethylene and propylene; and terpolymers of vinylidene fluoride, hexafluoropropylene, and tetrafluoroethylene; vinylidene fluoride, tetrafluoroethylene and perfluorovinyl ether; vinylidene fluoride, tetrafluoroethylene, and propylene; vinylidene fluoride and hydropentafluoropropylene and tetrafluoroethylene. The most preferred fluoroelastomer modified according to the invention is commercially available under the Viton® designation, such as a copolymer of vinylidenefluoride and hexafluoropropylene, or a terpolymer of vinylidenefluoride, tetrafluoroethylene, and hexafluoropropylene. Other suitable fluoroelastomers are available from Dyneon under the FLOREL® mark, and from Ausimont under the TECHNIFLON® mark.

The graft-functionalized fluoroelastomer utilized herein is the reaction product of a fluoroelastomer polymer and a grafting agent which contains a graft linking group which covalently bonds to the fluoroelastomer, and at least one active hydrogen-containing group, e.g., hydroxyl, thiol, or carboxyl group that undergoes bond formation to one of the reactive groups of the curing agent. The graft-modified fluoroelastomer is combined with the curing agent in admixture, within the time of the pot life (prior to gellation) of the admixture, prior to the time of coating the elastomer substrate.

Grafting Agent

The grafting agent contains one graft-linking group and one active hydrogen-bearing group. The preferred grafting agent contains a primary amine group and one active hydrogen-containing group. Examples include hydroxyamines, aminoisocyanate, aminoisocyanate, such as $(R_2)_2NCH_2CH_2NCO$, wherein $R_2$ is, for example, hydrogen or a hydrocarbyl group, hydroxyalkylamines, aminocarboxylates, aminosilane, amino silanol, aminothiols, and the like. Other suitable grafting agents that do not contain a primary amine as the graft-linking group are mercapto hydroxy, like mercaptoalcohols and mercaptosilanols, and mercaptothiols. The preferred grafting agents will graft to the fluoroelastomer at relatively mild temperatures (<60° C.) and can be monomeric, oligomeric or polymeric, and contains at least one active hydrogen-containing group and no more than one primary amine group, but can contain optionally secondary or tertiary amine groups, or other groups not capable of graft-linking and crosslinking the fluoroelastomer. An optional secondary amine is believed to increase the rate of the graft reaction of the primary amine graft-linking groups to the fluoroelastomer. Specific examples of grafting agents include the various hydroxyalkyl amines, e.g. 3-amino-1-propanol, aminoalkyl silanols, e.g., aminoalkyl silane triol or precursor aminoalkyl-alkoxysilanes which include within each molecule at least one basic nitrogen capable of catalyzing the hydrolysis of the alkoxysilane groups to produce the reactive silane triol; amine-N-oxides, amino(hydroxy) carboxylic acids, amido(hydroxy)amines, polyoxyalkylene polyether mono(primary)amines, and amine-terminated polyols. Such amine-terminal polyols can be made by the known aminating methods for the polyaddition of alkylene oxides, such as for example ethylene oxide, propylene oxide, butylene oxide, dodecyl oxide or styrene oxide onto amino-starter compounds. Generally, the polyol, such as a polyether polyol is aminated with ammonia in the presence of a catalyst such as a nickel containing catalyst, e.g., a Ni/Cu/Cr catalyst. The known methods are taught in U.S. Pat. No. 4,960,942; U.S. Pat. No. 4,973,761; U.S. Pat. No. 5,003,107; U.S. Pat. No. 5,352,835; U.S. Pat. No. 5,422,042; and U.S. Pat. No. 5,457,147, all incorporated herein by reference. The starter compounds used are ammonia or compounds containing amine groups and will provide in the reaction product no more than one primary amino group, such as for example aliphatic polyamines such as ethylenediamine, ethylenediamine oligomers (for example diethylenetriamine, triethylenetetramine or pentaethylenehexamine), ethanolamine, 1,3-propylenediamine, N-(2-Hydroxyethyl) ethylenediamine, 1,3- or 1,4-butylenediamine, 1,2-, 1,3-, 1,4-, 1,5-, 1,6-hexamethylenediamine, and the like. Suitable polyether blocks for the polyether-monoamines include polyethylene glycol, polypropylene glycol, copolymers of polyethylene glycol and polypropylene glycol, poly(1,2-butylene glycol), and poly(tetramethylene glycol).

The preferred amino-hydroxy grafting agent compounds are compounds having a molecular weight of less than about 1000, preferably 500, more preferably less than 250. More preferable amino-hydroxy grafting agents contain from 2 to 16 carbon atoms. With grafting agents having a molecular weights above about 1000, the degree of flexibility and solvent resistance of the coating is reduced. Examples of more preferred grafting agents include 3-amino-1-propanol, 2-(2-aminoethylamino)ethanol and aminoalkyl silanol, e.g., aminopropyl silane triol. The effective amount of grafting agent used in relation to the weight of fluoroelastomer is from 1–20%, preferably from 2–10% by weight, more preferably 3 to 7% by wt.

Other exemplary grafting agents which provide hydroxyl-functionalized fluoroelastomers, although less preferred, include grafting hydroxyl-functional ethylenic unsaturated compounds via a graft-addition reaction. A hydroxy or carboxy group-containing ethylenic unsaturated monomers are 2-hydroxyethyl (meth)acrylate, 1-hydroxypropyl (meth) acrylate, 2-hydroxypropyl (meth)acrylate, 2-hydroxyethyl vinyl ether, N-methylol(meth)acrylamide, methacrylic acid, and maleic anhydride, and can be grafted to the fluoroelastomer in the presence of a free radical initiator by techniques known in the art of reactive processing of polymers, widely practiced in thermoplastics such as polyolefins.

In another embodiment, a fluorocarbon elastomer is graft-functionalized by an addition reaction with a hydroxy(alkyl) mercaptan, aminothiol, or mercaptocarboxylic acid optionally containing hydroxy group(s). Suitable mercaptans which yield bound hydroxyl groups for addition to fluoroelastomers include hydroxymercaptans like mercaptoethanol, hydroxyalkylmercaptans, such as 1-mercapto-3-propanol, mercaptoethanolamine, 1-mercapto-4-butanol, α-mercapto-Ω-hydroxyoligoethylene oxides, e.g., α.-mercapto-Ω-hydroxyoctaethylene glycol, or the corresponding ethylene oxide/propylene oxide copolyethers. Mercaptoalkoxy compounds which yield hydroxy groups upon hydrolysis include γ-mercaptopropyltrimethoxysilane, γ-mercaptopropyltrimethoxysilane, γ-mercaptopropylmethyldimethoxysilane, and γ-mercaptopropylmethyldiethoxysilane, to name a few. Suitable mercaptocarboxylic acids and corresponding esters are mercaptoacetic acid, and esters of mercaptoacetic acid, mercaptopropionic acid and esters, mercaptobutyric acid and esters. Esterifying compounds containing hydroxy groups include ethylene glycol, propylene glycol, butylene glycol, diethylene glycol, triethylene glycol, tetraethylene glycol, octaethylene glycol, dipropylene glycol, tripropylene glycol, tetrapropylene glycol and N-methyldiethanolamine.

Some of the mercapto-compounds will graft-link to the fluoroelastomer per se under mild temperatures or at ambient temperatures. The addition of the above mercapto-compounds to graft to the fluoroelastomer can be carried out optionally with a free radical initiator in solution at a temperature above the decomposition temperature of the initiator, using for instance, an azo initiator such as azobisisobutyronitrile and azobiscyclohexanenitrile, a peroxide such as dilauroyl peroxide, benzpinacol silyl ether, or photoinitiators in the presence of UV or visible light. Diacyl peroxides, especially dilauroyl peroxide, didecanoyl peroxide, di(3,3,5-trimethylhexanoyl) peroxide, disuccinoyl peroxide and dibenzoyl peroxide, are suitable. An effective amount of free radical initiator is 0.5 to 10 wt. %, based on wt. of mercapto-compound. An effective amount of starting mercapto-compound is from 3% to 10% on wt. of fluoroelastomer, and is sufficient to bond at a level of 1% to 5% by wt. of bound hydroxyl groups to the fluoroelastomer.

The more preferred grafting agents are those that will graft to the fluoroelastomer at room temperature, obtainable by the use of such compounds as 2-(2-aminoethylamino) ethanol (NH2-CH2-CH2-NH-CH2-CH2-OH)(CAS # 111-41-1) and aminopropylsilanetriol, such as supplied in a 22–25% solution in water by Gelest, Inc. as SIA0608.0 (CAS#29159-37-3).

Curing Agent

The curing component crosslinks the fluoroelastomer in the form of a continuous film applied to the elastomer substrate in a thickness from 25 µm to 2 mm and which firmly adheres to the elastomer substrate in a chemical and flex-resistant bond. The limited graft sites of no more than 10 mol % of the fluoroelastomer, retain essential flexibility in the crosslinked fluoroelastomer coating. The curing agent is a multifunctional component that contains at least two groups which bond to different active hydrogen-bearing groups on the graft-functionalized fluoroelastomer. The preferred curing component contains at least one isocyanate group or a group bearing an isocyanate group, and a reactive crosslinking group that bonds to another active hydrogen-bearing group of the fluoroelastomer to form a chemical crosslink. An exemplary curing component capable of curing at low temperatures is a polyisocyanate.

The polyisocyanates include aliphatic, cycloaliphatic and aromatic isocyanate functional compounds other than isocyanate-capped polymers. Aromatic polyisocyanates are preferred. Specific examples of polyisocyanates include, without limitation, aliphatic diisocyanates such as 1,6-hexamethylene diisocyanate; 1,8-octamethylene diisocyanate; 1,12-dodecamethylene diisocyanate; 2,2,4-trimethylhexamethylene diisocyanate, and the like; -3,3'-diisocyanatodipropyl ether; 3-isocyanatomethyl-3,5,5'-trimethylcyclodexyl isocyanate; hexamethylene diisocyanate; 4,4'-methylenebis(cyclohexyl isocyanate); cyclopentalene-1,3-diisocyanate; cyclodexylene 1,4,-diisocyanate; methyl 2,6-diisocyanatocaprolate; bis-(2-isocyanatoethyl)-fumarate; 4-methyl-1,3-diisocyanatocyclohexane; trans-vinylene diisocyanate and similar unsaturated polyisocyanates; 4,4',-methylene-bis (cyclohexylisocyanate) and related polyisocyanates; methane diisocyanates; bis-(2-isocyanatoethyl) carbonate and similar carbonate polyisocyanates; N,N',N"-tris-(6-isocyanatohexamethylene)biuret and related polyisocyanates. Aromatic di- and polyisocyanates include toluene diisocyanates; xylene diisocyanates; dianisidine diisocyanate; 4,4'-diphenylmethane diisocyanate; 1-ethoxy-2,4-diisocyanatobenzene; 1-chloro-2,4-diisocyanatobenzene; bis(4-isocyanatophenyl)methane; tris(4-isocyanatophenyl) methane; naphthalene diisocyanates; 4,4'-biphenyl diisocyanate; phenylene diisocyanates such as m- and p-phenylene diisocyanate; 3,3'-dimethyl-4,4'-biphenyl diisocyanate; p-isocyanatobenzoyl isocyanates; tetrachloro-1,3-phenylene diisocyanate; 2,4-toluene diisocyanate, 2,6-toluene diisocyanate, 4,4'-isocyanate, bis-[isocyanatopheny] methane polymethylene poly(phenyl isocyanate), isophrone diisocyanate, and other aliphatic, heterocyclic and aromatic polyisocyanates, and including mixtures of such polyisocyanates. Exemplary commercial products are trimethylhexamethylene diisocyanate available from VEBA, heptadecyl (C17) diisocyanate, DDI 1410 an aliphatic C-36 diisocyanate available from the Henkel Corporation of Minneapolis, Minn. and Isonate® 143L diisocyanate, a modified diphenylmethane diisocyanate (MDI) available from Upjohn Corp. Further urethane components are isophorone diisocyanate available from VEBA and Desmodur® N an aliphatic triisocyanate available from Mobay. Desmodur® N is more particularly defined as the reaction product of 3 moles of hexamethylene diisocyanate and water having an isocyanate equivalent weight of 191. Other adducts or prepolymers of the polyisocyanate include Desmodur® L and Mondur® CB which are the adducts of tolylene diisocyanate (TDI). The amount of di- or polyisocyanate included should be from 3 to 30 phr. Preferably the amount is from 8 to 15 phr.

Other suitable curing components are the various known organosilanes. Preference is for an organosilane that contains an isocyanate group and another group capable of forming crosslinks, such as a hydrolysable group, namely halogen, hydroxy, alkoxy, or acyloxy group; an epoxy-containing group; a mercapto group; a mercapto-containing group; a vinyl group; a vinyl-containing group; another isocyanate group; another isocyanate-containing group; an ureido group; an ureido-containing group; an imidazole group; or an imidazole-containing group. Such compounds are known in the art.

The preferred crosslink-forming group of the isocyanatosilane type is an alkoxy or hydroxy group. Examples of commercially available isocyanato-alkoxy silanes which are suitable herein include gamma-isocyanatopropyltrimethoxysilane, available as Silquest® Y-5187 from OSi Specialties Group, a Witco company (OSi), and gamma-isocyanatopropyltriethoxysilane, available as Silquest® A-1310, also from OSi.

Solvent

The coating components are mixed and dispersed in an organic solvent carrier of the homogeneous, refined mixture of solids. Upon coating the elastomer the solvents are readily removed by evaporation. Examples of suitable liquid solvents are ketones such as methyl ethyl ketone, methyl isobutyl ketone, and the like; ethers, low molecular weight esters, nitro containing compounds, etc., including mixtures of such carriers. Preferred organic diluents are methylethyl ketone, methylisobutyl ketone, and diisobutyl ketone. The amount of the solvent employed is that which provides a composition suitable for use as an adhesive. The organic solvent diluent/carrier amount will ordinarily be such as to provide a total solids content (TSC) ranging from about 5 to 80, preferably about 10 to about 40 percent by weight, and more preferredly 15 to 30 wt. %.

Optional Components

The coating composition of the present invention may contain other optional ingredients such as metal oxides and particulate reinforcements. Specific examples of conventional metal oxides include zinc oxide, magnesium oxide, and lead oxide, while specific examples of particulate reinforcements useful in the invention include carbon black, precipitated silica, and fumed silica. The optional particulate reinforcement may be utilized in various amounts up to about 50 percent by weight of the fluoroelastomers.

Preparation

The coating composition may be prepared by simply mixing the ingredients by hand with a spatula or the like or by mechanical mixing or shaking. The coating composition is typically applied to an elastomeric material and/or other substrate by dipping, spraying, wiping, brushing or the like, after which the coating is allowed to dry for a period of time typically ranging from about 30 minutes to 2 hours, preferably from about 45 minutes to 1 hour. The coating composition is typically applied to form a dry layer on the substrate having a thickness ranging from about 0.1 to 5 mils, preferably from about 0.5 to 1.5 mils. The coating composition typically cures within about 4 to 24 hours at room temperature. The cure can be accelerated by exposing the coating to elevated temperatures, but this is not required.

Elastomer Substrates

The coating composition of the present invention is particularly suitable for coating engine mounting devices which are comprised of vulcanized elastomeric parts that have been bonded to metal parts. The elastomeric surface or substrate to be coated may optionally be pretreated with a chlorinating agent such as sodium hypochlorite and hydrochloric acid. The use of various chlorinating agents to prepare elastomeric materials for application of a coating composition is well known in the art. One example of a chlorinating agent is commercially available from Lord Corporation under the tradename CHEMLOK® 7701. The chlorinating agent may be applied to the surface of the elastomeric material by brushing, dipping, spraying, wiping, or the like, after which the chlorinating agent is allowed to dry. Chlorinating agents tend to be very volatile and typically dry within a matter of seconds or minutes.

Features

The coating compositions of the present invention have the surprising ability to adequately bond to both the flexible elastomeric part and the rigid metal part so that the boundary between the elastomer and metal can be adequately protected by the coating composition. The present invention is therefore distinguished from many traditional protective coating compositions which only have the ability to bond to one type of substrate to be protected.

The following examples are provided for purposes of illustrating the present invention and shall not be constructed to limit the scope of the invention which is defined by the claims.

EXAMPLE 1

| Ingredient | Description | PHR |
| --- | --- | --- |
| Viton A-100 | fluoroelastomer | 100.0 |
| Calcium Hydroxide | | 2.0 |
| Magnesium oxide | | 1.0 |
| 3-amino-1-propanol | | 5.0 |
| Carbon Black | | 2.0 |

The above components wt. parts were mixed in a lab Banbury® mixer and dumped at 230° F. providing the graft functionalization of aminopropanol to the fluoroelastomer. The dumped material was dissolved in 70 wt. % of Methyl Isobutyl Ketone (MIBK, CAS No. 108-10-1) to render a solution having a solids content of 30% by weight.

40 wet parts, by weight of the above solution was combined with 1.2 wet parts of Casabond® TX (bis-[isocyanatopheny] methane CAS No. 202-68-8, 53% in xylene CAS No. 1330-20-7).

The coating was applied on a 55 durometer natural rubber compound which had been treated with a solvent wipe with MIBK and coated with a primer (Chemlok® 7701). The coated elastomer was compared against a control with no coating and a commercial fluorocarbon coating PLV-2100 available from Pelseal Technologies, LLC.

When immersed in Jet A fuel for 24 hours at room temperature, the following volume swell results were recorded:

| Example | % swell in Jet A fuel |
| --- | --- |
| Uncoated | 192.9% |
| PLV 2100 commercial coating | 0.1% |
| Example 1 | 0.2% |

Figure 2:
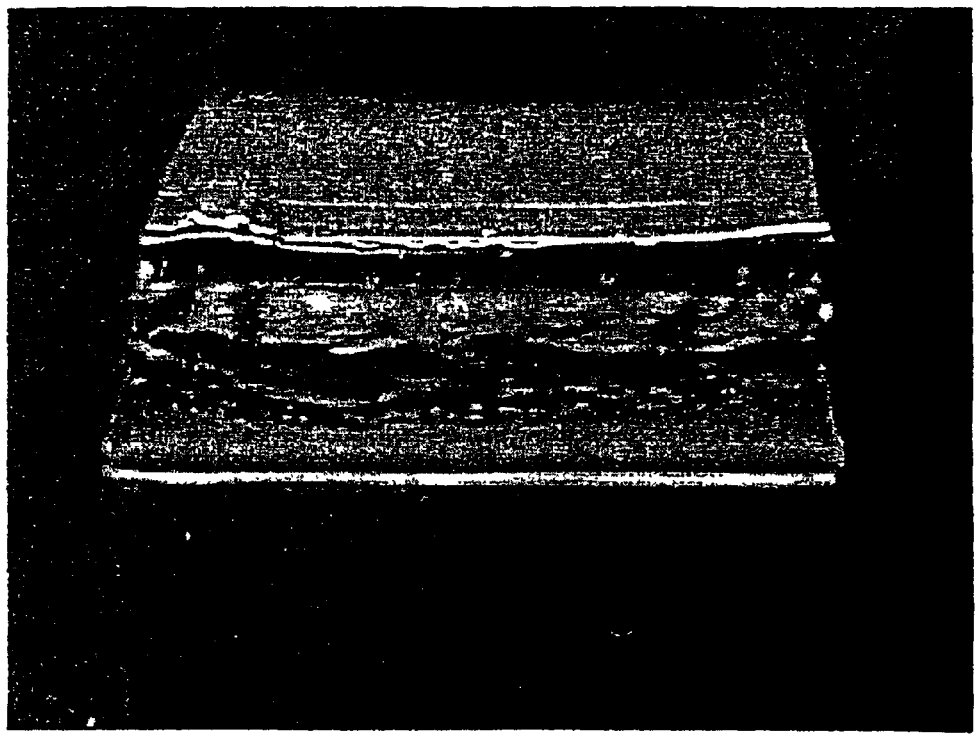
FIG. 2, is a photograph of a DeMattia flex specimen coated with the coating according to the invention after 60,000 flex cycles.

Unpierced DeMattia flex specimens (made from a 55 durometer natural rubber compound) were coated with these same coatings and flexed in accordance with ASTM D-813. FIG. 2 shows that the PLV-2100 coating is severely cracked and delaminated, exposing the substrate in less than 4000 cycles. Example 1 ran 60,000 cycles at which point the natural rubber substrate itself was beginning to crack. There was no sign of delamination in the coating of example 1. FIG. 1 illustrates that after 60,000 cycles, the underlying substrate itself has begun to crack, however the coating remains intact.

EXAMPLE 2

A coating solution was prepared as follows.

| Ingredient | Description | PHR |
| --- | --- | --- |
| Viton A-100 | fluoroelastomer | 100.0 |
| Calcium Hydroxide | | 2.0 |
| Magnesium oxide | | 1.0 |

The above components wt. parts were mixed in a lab Banbury® mixer and dumped at 230° F. The mixed material was dissolved in 70 wt. % of Methyl Isobutyl Ketone (MIBK, CAS No. 108-10-1) to render a solution having a solids content of 30% by weight.

40 wet parts, by weight of the above solution was combined with 0.5 wet parts of 2-(2-aminoethylamino)ethanol (CAS # 111-41-1). This material grafted in the solution within 24–48 hours at room temperature. The resulting grafted solution was cured with 1.2 wet parts of Casabond® TX (bis-[isocyanatopheny] methane CAS No. 202-68-8, 53% in xylene CAS No. 1330-20-7) or with 1.6 wet parts of 3-isocyanatopropyltriethoxysilane, CAS # 24801-88-5. The Casabond® TX cures in 30 minutes and the 3-isocyanatopropyltriethoxysilane cures overnight.

Both coatings were applied on a 55 durometer natural rubber compound which had been treated with a solvent wipe with MIBK and coated with a primer (Chemlok® 7701).

Unpierced DeMattia flex specimens (made from a 55 durometer natural rubber compound) were coated with these same coatings and flexed in accordance with ASTM D-813. Both coatings ran 80,000 cycles at which point the natural rubber substrate itself was cracked.

It is understood that the foregoing description of preferred embodiments is illustrative, and that variations may be made in the present invention without departing from the spirit and scope of the invention. Although illustrated embodiments of the invention have been shown and described, a latitude of modification, change and substitution is intended in the foregoing disclosure, and in certain instances some features of the invention will be employed without a corresponding use of other features. Accordingly, it is appropriate that the appended claims are to be construed in a manner consistent with the scope of the invention.

What is claimed is:

1. A coating composition made from a mixture of two parts, the first part comprising a solution in organic solvent of a graft-reaction product of a fluoroelastomer selected from the group consisting of a polymer of 1,1-dihydroperfluorobutyl acrylate; copolymer of vinylidene fluoride and chlorotrifluoroethylene; copolymer of vinylidene fluoride and hexafluoropropylene; copolymer of vinylidene fluoride and hydropentafluoropropylene; copolymer of tetrafluoroethylene and propylene; terpolymers of vinylidene fluoride, hexafluoropropylene, and tetrafluoroethylene; terpolymer of vinylidene fluoride, tetrafluoroethylene and perfluorovinyl ether, terpolymer of vinylidene fluoride, tetrafluoroethylene, and propylene; and a terpolymer of vinylidene fluoride and hydropentafluoropropylene and tetrafluoroethylene, and a grafting agent grafted to said fluoroelastomer via a primary amine group, said grafting agent containing at least one active hydrogen-containing group,
and the second part comprising a curing agent that contains at least one isocyanate group or a group bearing an isocyanate group that bonds to an active-hydrogen-bearing group of said fluoroelastomer, and a reactive crosslinking group that bonds to another active hydrogen-bearing group of said fluoroelastomer.

2. A coating composition according to claim 1 wherein said grafting agent is selected from the group consisting of monomeric, oligomeric or polymeric: hydroxyamine, hydroxyalkylamine, aminocarboxylate, aminosilane, and aminothiol.

3. A coating composition according to claim 1 wherein the grafting agent is an organosilane which contains an isocyanate group and another group selected from the group consisting of halogen, hydroxy, alkoxy, acyloxy group, epoxy group, mercapto group; a mercapto-containing group, vinyl group, vinyl-containing group, another isocyanate group, another isocyanate-containing group, an ureido group, an ureido-containing group, an imidazole group, or an imidazole-containing group.

4. A coating composition according to claim 1 wherein said grafting agent has a molecular weight of less than 1000.

5. A coating composition according to claim 1 wherein said grafting agent is selected from the group consisting of 3-amino-1-propanol, 2-(2-aminoethylamino)ethanol, and aminopropyl silane triol.

6. A coating composition according to claim 5 wherein the amount of grafting agent incorporated in relation to the weight of fluoroelastomer is from 1 to 20 wt. percent.

7. A coating composition in two parts, the first part comprising a solution in organic solvent of a graft-reaction product of a fluoroelastomer and a grafting agent which comprises one ethylenic unsaturated group and at least one active hydrogen-containing group, the second part comprising a di- or polyisocyanate curing component.

8. A coating composition according to claim 7 wherein said grafting agent is selected from the group consisting of 2-hydroxyethyl (meth)acrylate, 1-hydroxypropyl (meth) acrylate, 2-hydroxypropyl (meth)acrylate, 2-hydroxyethyl vinyl ether, N-methylol(meth)acrylamide, methacrylic acid, and maleic anhydride.

9. A coating composition according to claim 1 wherein the solvent is selected from the group consisting of ketones, ethers, esters, nitro compounds, and mixtures thereof.

10. A coating composition according to claim 1 wherein said curing agent is an aliphatic, cycloaliphatic or aromatic di- or polyisocyanate.

11. The coating composition of claim 10 wherein said di- or polyisocyanates is selected from the group consisting of as 1,6-hexamethylene diisocyanate; 1,8-octamethylene diisocyanate; 1,12-dodecamethylene diisocyanate; 2,2,4-trimethylhexamethylene diisocyanate, and the like; 3,3'-diisocyanatodipropyl ether; 3-isocyanatomethyl-3,5,5'-trimethylcyclodexyl isocyanate; hexamethylene diisocyanate; 4,4'-methylenebis(cyclohexyl isocyanate); cyclopentalene-1,3-diisocyanate; cyclodexylene-1,4,-diisocyanate; methyl 2,6-diisocyanatocaprolate; bis-(2-isocyanatoethyl)-fumarate; 4-methyl-1,3-diisocyanatocyclohexane; trans-vinylene diisocyanate; 4,4'-methylene-bis(cyclohexylisocyanate); methane diisocyanates; bis-(2-isocyanatoethyl) carbonate; N,N',N"-tris-(6-isocyanatohexamethylene)biuret, toluene diisocyanates; xylene diisocyanates; dianisidine diisocyanate; 4,4'-diphenylmethane diisocyanate; 1-ethoxy-2,4-diisocyanatobenzene; 1-chloro-2,4-diisocyanatobenzene; bis(4-isocyanatophenyl)methane; tris(4-isocyanatophenyl) methane; naphthalene diisocyanate; 4,4'-biphenyl diisocyanate; m-phenylene diisocyanate; p-phenylene diisocyanate; 3,3'-dimethyl4,4'-biphenyl diisocyanate; p-isocyanatobenzoyl isocyanate; tetrachloro-1,3-phenylene diisocyanate; 2,4-toluene diisocyanate,2,6-toluene diisocyanate, 4,4'-isocyanate,bis-[isocyanatopheny] methane polymethylene poly(phenyl isocyanate), isophrone diisocyanate, mixtures thereof.

12. The coating of claim 1 wherein said curing agent is a di- or polyisocyanate and is present at from 3 to 30 wt. parts per 100 wt. parts of said fluoroelastomer.

13. The coating of claim 1 wherein said curing agent is a di- or polyisocyanate and is present at from 8 to 15 wt. parts per 100 wt. parts of fluoroelastomer.

14. A coating composition of claim 1 wherein said grafting agent contains in addition to said primary amine group, at least one hydroxyl, carboxyl or thiol group, and wherein said second part comprises a curing component containing at least two groups reactive with a hydroxyl, carboxyl or thiol group.

* * * * *